United States Patent
Doering et al.

(10) Patent No.: US 9,921,628 B2
(45) Date of Patent: Mar. 20, 2018

(54) POWER CONVERTER FOR A COMPUTER DEVICE AND METHOD FOR OPERATING A POWER CONVERTER

(71) Applicant: International Business Machines Corporation, Armonk, NY (US)

(72) Inventors: Andreas C. Doering, Zufikon (CH); Rihards Dziedatajs, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 14/461,772

(22) Filed: Aug. 18, 2014

(65) Prior Publication Data
US 2015/0089253 A1  Mar. 26, 2015

(30) Foreign Application Priority Data
Sep. 26, 2013 (GB) .................................. 1317080.8

(51) Int. Cl.
| | |
|---|---|
| *H02M 3/04* | (2006.01) |
| *G06F 1/26* | (2006.01) |
| *H02M 3/156* | (2006.01) |
| *H02M 1/00* | (2006.01) |

(52) U.S. Cl.
CPC .............. *G06F 1/26* (2013.01); *H02M 3/156* (2013.01); *H02M 2001/0025* (2013.01)

(58) Field of Classification Search
CPC .. G06F 1/26; H02M 3/156; H02M 2001/0025
See application file for complete search history.

(56) References Cited

U.S. PATENT DOCUMENTS

| | | | |
|---|---|---|---|
| 2,412,961 | A1 | 7/2002 | Lethellier |
| 6,737,840 | B2 | 5/2004 | McDonald et al. |
| 7,268,527 | B2 | 9/2007 | Horner |
| 7,370,213 | B2 | 5/2008 | Odaohhara |

(Continued)

OTHER PUBLICATIONS

Search Report under Section 17(5) dated Mar. 20, 2014, Application No. GB1317080.8, 3 pages.
Boscaino, V. et al., "Current-Sensing Technique for Current-Mode Controlled Voltage Regulator Modules", Microelectronics Journal Archive, vol. 39, Issue 12, Dec. 2008, pp. 1852-1859.
Doering, Andreas C. , "Monitoring and Controlling System for Microservers", 2013 IEEE International Symposium on Parallel & Distributed Processing Workshops and PHD Forum, Cambridge, MA, May 20-24, 2013, pp. 1538-1541.

(Continued)

*Primary Examiner* — Thomas Lee
*Assistant Examiner* — Vincent Chang
(74) *Attorney, Agent, or Firm* — Francis Lammes; Stephen J. Walder, Jr.; Mercedes L. Hobson

(57) ABSTRACT

A power converter for a computer device having a processing unit and a memory device is suggested. The power converter is connectable to the computer device by a coupling circuitry, wherein the computer device requires an actual input voltage. The power converter comprises a voltage regulator, a measuring entity, and a determining entity. The voltage regulator is configured to control an actual output voltage for the coupling circuitry based on a determined reference output voltage. The measuring entity is configured to measure an actual output current of the voltage regulator output to the coupling circuitry. The determining entity is configured to determine the determined reference output voltage such that the determined reference output voltage equals a sum of the actual input voltage of the computer device and the product of the measured actual output current and a resistance of the coupling circuitry.

17 Claims, 8 Drawing Sheets

(56) References Cited

U.S. PATENT DOCUMENTS

| | | | |
|---|---|---|---|
| 2,034,662 | A1 | 2/2012 | Ostrom et al. |
| 2,211,961 | A1 | 2/2013 | Hernandez |
| 8,370,213 | B2 | 2/2013 | Ku |
| 2008/0278132 | A1 | 11/2008 | Kesterson et al. |
| 2011/0279437 | A1* | 11/2011 | Komiya ............... G09G 3/3233 345/212 |
| 2012/0038329 | A1 | 2/2012 | Hampo et al. |
| 2012/0062195 | A1 | 3/2012 | Ting |
| 2012/0154013 | A1 | 6/2012 | Mera et al. |
| 2013/0106501 | A1* | 5/2013 | Yoo ............................ G05F 1/56 327/538 |
| 2015/0015078 | A1* | 1/2015 | Kim ................... H03K 19/0175 307/103 |

OTHER PUBLICATIONS

Forghani-Zadeh, H. P. et al., "A Lossless, Accurate, Self-Calibrating Current-Sensing Technique for DC-DC Converters", 31st Annual Conference of Industrial Electronics Society (IECON'05), IEEE, Nov. 6-10, 2005, pp. 549-554.

Forghani-Zadeh, Hassan P. et al., "Current-Sensing Techniques for DC-DC Converters", Proceedings of the 2002 45th Midwest Symposium on Circuits and Systems, Tulsa, OK, Aug. 4-7, 2002, 4 pages.

Luijten, Ronald P. et al., "The DOME embedded 64 bit microserver demonstrator", 2013 IEEE International Conference on IC Design & Technology (ICICDT'13), Pavia, Italy, May 29-31, 2013, pp. 203-206.

\* cited by examiner

POWER CONVERTER FOR A COMPUTER DEVICE AND METHOD FOR OPERATING A POWER CONVERTER

This invention was made with NL Government support under 2011_049 awarded by DOME. The NL Government has certain rights to this invention.

BACKGROUND

The invention relates to a power converter for a computer device and to a method for operating a power converter for a computer device. Further, the invention relates to method and to a computer program for operating a power converter for a computer device.

Conventional computer devices, like processors, operate on even lower supply voltages, resulting in higher supply currents for the same dissipating power. For example, there are processors that require up to 145 A or more at typically 1V supply voltage. With such a high current, even short traces on a printed circuit board with a resistance in the milliohm range may cause a considerable voltage drop, in particular considering the low supply voltage of 1V for example. In order to guarantee a correct voltage at the load device, a separate feedback wire may be used that senses the resulting voltage as close to the load as possible for example on the processor die directly. Disadvantageously, such as separate feedback wire may be not used in cases where it is hard or even impossible to install such a feedback wire, for example because of limited available space in the processing system.

Document U.S. Pat. No. 6,737,840 B2 shows a switching DC/DC converter with the output voltage changing inversely to any change in the converter inductor current. In the DC-DC converter, a technique for sensing current supplied to a load and establishing an output voltage that conforms to a predetermined load line is used. The current carried by an inductor is sensed and used to control the duty cycle of the voltage applied to the inductor, thereby controlling the output voltage. A current sensing circuit includes a feedback network. A pole attributable to the feedback network cancels a zero attributable to the inductor so that a control voltage is developed that varies substantially linearly with the load current.

Document U.S. Pat. No. 7,370,213 B2 describes a power supply unit and a computer. A series power supply circuit and a switching power supply circuit are combined within a single power supply unit. The switching power supply circuit provides an efficiency lower than that of the series power supply circuit under a light load and provides efficiency higher than that of the series power supply circuit under a heavy load. A standby signal that is asserted under a light load and is deasserted under a heavy load is input to a negative logic enable terminal of the series power supply circuit through an inverter0. The standby signal is directly input to the negative logic enable terminal of a PWM controller in the switching power supply circuit. A series power supply circuit and a switching power supply circuit are combined within a single power supply unit. The switching power supply circuit provides an efficiency lower than that of the series power supply circuit under a light load and provides efficiency higher than that of the series power supply circuit under a heavy load. A standby signal that is asserted under a light load and is deasserted under a heavy load is input to a negative logic enable terminal of the series power supply circuit through an inverter0. The standby signal is directly input to the negative logic enable terminal of a PWM controller in the switching power supply circuit.

Document U.S. Pat. No. 8,120,346 B2 shows a method and an apparatus for current sensing the current in a circuit, such as an inductor circuit. The current sensing system may comprise an RC element connected such that the RC time constant matches the L/R time constant of the inductor. The current sensor may be configured to generate voltages that are proportional to the instantaneous current in the inductor with scaled gain for a wide range of inductor self-resistance values.

Document U.S. Pat. No. 6,424,129 B1 describes a method and an apparatus for accurately sensing an output current in a DC-to-DC voltage converter. The apparatus and the method for accurately sensing the output current delivered to a load by a buck-type DC-to-DC switched mode power converter corrects for thermal variation of the output inductor. A first current sense signal provides a fast indication of output current of the DC-to-DC converter that is susceptible to thermal variation of the output inductor of the converter, and a second current sense signal provides a slow but accurate indication of output current that is not affected by the thermal variation. The first current sense signal is corrected using the second current sense signal to yield accurate output current sensing information.

Document U.S. Pat. No. 7,268,527 B2 shows a method and an apparatus for determining a load current in a CPU core voltage regulator. The apparatus and the method for measuring output current and power in real-time is provided for a CPU core powered by a DC-to-DC power converter having active voltage positioning. A switched mode power converter may comprise at least one power switch operatively coupled to an input voltage source, an output filter operatively coupled to the at least one power switch to provide an output voltage and output current to a load, and a control circuit coupled to the at least one power switch. The control circuit activates the power switch with a duty cycle controlled to regulate at least one of the output voltage and the output current. The control circuit receives a first control signal defining a desired value for the output voltage, a second control signal defining a relationship between voltage input and current draw for the load, and a voltage sense signal corresponding to an actual value of the output voltage. The control circuit thereby provides a measurement of load current.

Document US 2012/0154013 A1 describes an apparatus including a memory module and power converter and method of operating the same. The apparatus includes a memory module, located on a circuit board, configured to operate from a first voltage and a second voltage being a multiple of the first voltage. The apparatus also includes a power converter employing a switched-capacitor power train, located on the circuit board, configured to provide the second voltage for the memory module from the first voltage.

Accordingly, it is an aspect of the present invention to provide an improved power converter for a computer device.

SUMMARY

In one illustrative embodiment, a method, in a data processing system, is provided for a computer device coupled to the power converter by a coupling circuitry and requiring an actual input voltage. The illustrative embodiment controls, by a voltage regulator, an actual output voltage of the voltage regulator of the power converter for the coupling circuitry based on a determined reference output voltage. The illustrative embodiment measures, by a measuring entity, an actual output current of the voltage regulator output to the coupling circuitry. The illustrative embodiment determines, by a determining entity, the determined reference output voltage such that the determined reference output voltage equals a sum of the actual input voltage of the computer device and the product of a measured actual output current and a resistance of the coupling circuitry.

In another illustrative embodiment, a power converter for a computer device having a processing unit and/or a memory device is provided. The power converter is coupled to the computer device by a coupling circuitry, wherein the computer device requires an actual input voltage. The power converter comprises a voltage regulator, a measuring entity, and a determining entity. The voltage regulator is configured to control an actual output voltage for the coupling circuitry based on a determined reference output voltage. The measuring entity is configured to measure an actual output current of the voltage regulator output to the coupling circuitry. The determining entity is configured to determine the determined reference output voltage such that the determined reference output voltage equals a sum of the actual input voltage of the computer device and the product of the measured actual output current and a resistance of the coupling circuitry.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In the following, exemplary embodiments of the present invention are described with reference to the enclosed figures.

BRIEF DESCRIPTION OF THE SEVERAL VIEWS OF THE DRAWINGS

Similar or functionally similar elements in the figures have been allocated the same reference signs if not otherwise indicated.

DETAILED DESCRIPTION

Figure 1:
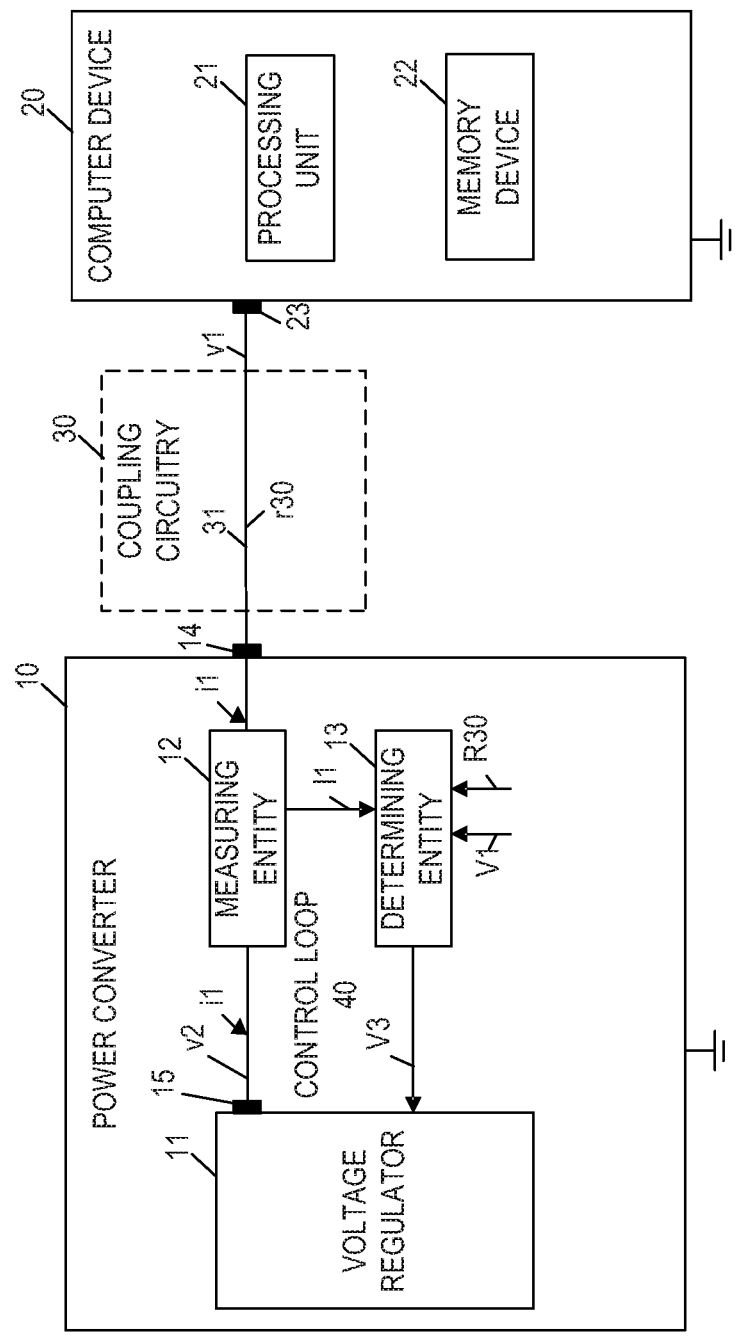
FIG. 1 shows a schematic block diagram of a first embodiment of a power converter coupled to a computer device.

The present power converter provides a forward compensation of a voltage drop at the coupling circuitry, e.g. a wire connecting the power converter and the computer device.

Assuming that V1 indicates the stable input voltage needed at the computer device, v2 the actual output voltage of the voltage generator, I1 the measured actual output voltage of the voltage generator, V3 the reference output voltage of the voltage generator and R30 the resistance (or resistance model) of the coupling circuitry, the voltage regulator controls the actual output voltage v2 of the voltage generator such that v2 corresponds to V3 and the following equation is fulfilled:

$$v2 = V1 + I1 \cdot R30$$

Therefore, the present power converter may also be called forward compensation power converter. Advantageously, the forward compensation power converter compensates the voltage drop at the coupling circuitry without any feedback circuitry or feedback wire from the computer device to the power converter.

Thus, a system including the present power converter and the connected computer device may be used in situations where it is hard or even impossible to install a feedback circuitry, e.g. because of limited available space in the processing system, like a microserver. For example, microservers are described in "Monitoring and Controlling System for Microservers", Andreas Doering (IBM Research Laboratory, Switzerland) and Tibor Kiss (Gamax Kft, Hungary), 18th IEEE Workshop on Dependable Parallel, Distributed and Network-Centric Systems; Booktitle: IDPDS 2013 workshops and in IEEE Xplore—The DOME embedded 64 bit microserver demonstrator.

By means of the above equation, the present forward compensation power converter compensates a non-zero resistance of the coupling circuitry by increasing the output voltage of the voltage regulator accordingly.

According to some implementations, the power converter may be a DC/DC converter. For example, the DC/DC converter receives an input voltage of 12 V and outputs an output voltage of 1 V for the computer device. Further, the power converter may be a modular power converter which provides different output voltages to groups of connected computer devices.

According to some implementations, the computer device may be a processor or a processing system, e.g. comprising at least a processing unit and/or a memory device.

Further, according to some implementations, the coupling circuitry may only consist of one wire directly connecting the computer device with the power converter. Moreover, the coupling circuitry may consist of a connection of a plurality of wires and a number of connectors, like on-board connectors. The stable input voltage may be about 1 V. The stable input voltage is constant or has only very small deviations, e.g. in the range of mV.

According to some implementations, the measuring entity includes a measuring resistance (measuring shunt) for providing the measured actual output current. The measured actual output current may be provided as a parameter indicating the measured actual output current. Alternatively, the measuring entity may output a voltage which is indicative for the measured actual output current.

According to some implementations, the voltage regulator and/or the determining entity may be implemented in hardware and/or in software. If it is implemented in hardware, it may be embodied as a device, e.g. as an ASIC, or as a processor or as a part of a system. If it is implemented in software, it may be embodied as a computer program product, as a function, as a routine, as a program code or as an executable object, in particular executable at a processing unit of the power converter.

Examples for measuring such an output current of the voltage regulator are given in "Current-Sensing Techniques for DC-DC Converters" by Forghani-Zadih, Rincon-Mora.

In the Figures, a small letter u indicates the physical variable of the voltage, wherein a capital U indicates a parameter (determined, measured or calculated) representing the value of the physical variable at the line.

Furthermore, a small letter i indicates the physical variable of the current, wherein a capital letter I indicates a parameter (determined, measured or calculated) representing the value of the physical variable at the line.

In FIG. 1, a schematic block diagram of a first embodiment of a power converter 10 coupled to a computer device 20 is depicted. The computer device 20 comprises a processing unit 21 and a memory device 22. The power converter 10 is connected to the computer device 20 by a coupling circuitry 30. In the example of FIG. 1, the coupling circuitry 30 is embodied as a single wire 31. The coupling circuitry 30 has a certain actual resistance r30.

The wire 31 in FIG. 1 forms the sole electrical connection between the power connector 10 and the computer device 20. In particular, there is no feedback wire from the computer device 20 to the power converter 10.

The power converter 10 includes a voltage regulator 11, a measuring entity 12, a determining entity 13 and an output terminal 14 of the power converter 10. Moreover, FIG. 1 shows the output terminal 15 of the voltage regulator 11. In particular, the wire 31 of the coupling circuitry 30 couples the output terminal 14 of the power converter 10 with the input terminal 23 of the computer device 20. The computer device 20 requires an actual input voltage v1 at its input terminal 23.

The operation of the power converter 10 for providing the actual input voltage v1 to the input terminal 23 of the computer device 20 is explained in detail in the following:

The voltage regulator 11 is adapted to control an actual output voltage v2 for the coupling circuitry 30 based on a determined reference output voltage V3, in particular such that v2 corresponds to V3. The voltage regulator 11 outputs the actual output voltage v2 at its output terminal 15. The output terminal 15 of the voltage regulator 11 is not only coupled to the output terminal 14 of the power converter 10, but also to the measuring entity 12. The measuring entity 12 is configured to measure an actual output current i1 of the voltage regulator 11 which is provided in response to the actual output voltage v2. The measuring entity 12 provides the measured actual output current I1 to the determining entity 13. The determining entity 13 is configured to determine the reference output voltage V3 such that it equals a sum of the stable input voltage V1 of the computer device 20 and the product of the measured actual output current I1 and the resistance R30 of the coupling circuitry 30. The resistance R30 of the coupling circuitry 30 is a parameter describing the actual resistance r30 of the coupling circuitry 30 coupling the power converter 10 and the computer device 20:

$$v2=V1+I1 \cdot R30$$

In particular, the voltage regulator 11, the measurement entity 12 and the determining entity 13 form a control loop 40 for providing the actual supply voltage v1 to the computer device 20. For example, the determining entity 13 may be embodied as a determining circuitry, the determining circuitry may include at least one operational amplifier (see FIG. 7, for example).

Figure 2:
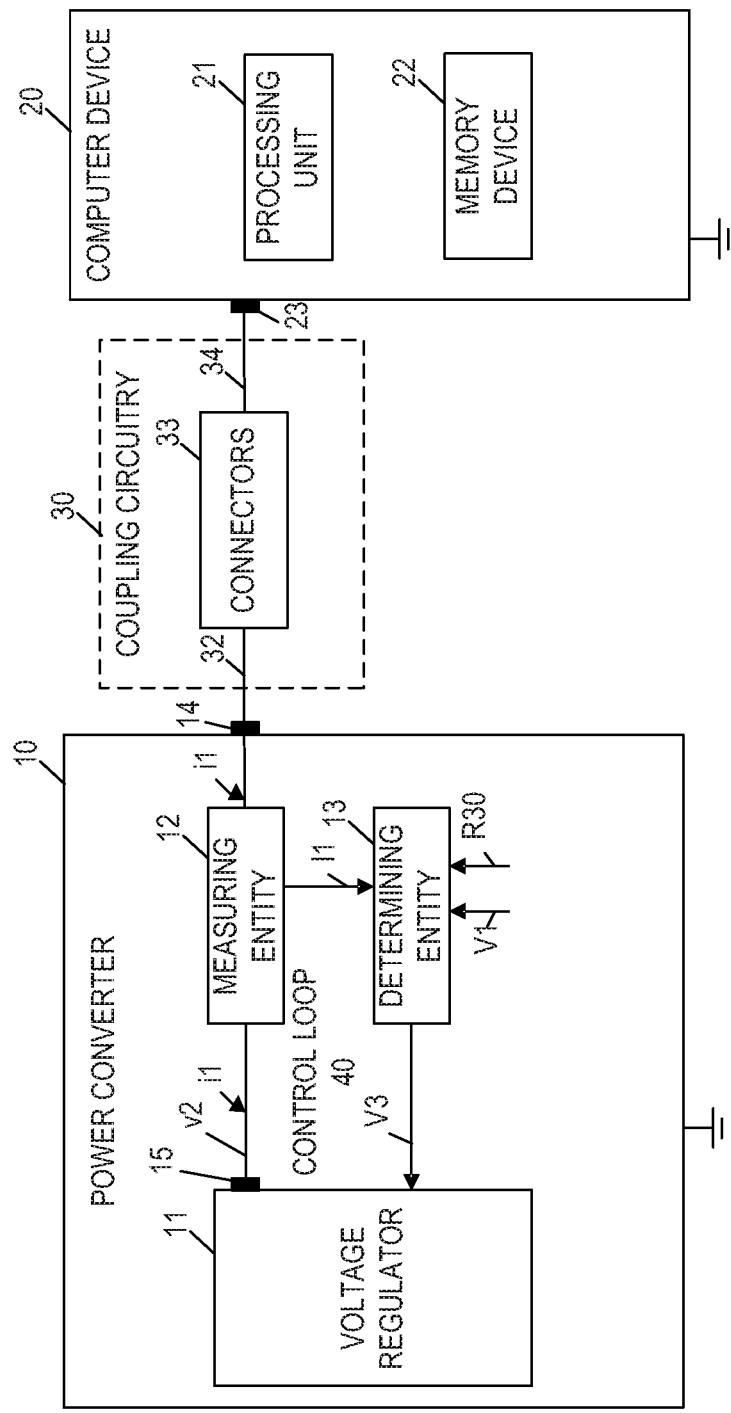
FIG. 2 shows a schematic block diagram of a second embodiment of a power converter coupled to a computer device.

FIG. 2 shows a schematic block diagram of a second embodiment of a power converter 10 coupled to a computer device 20. The third embodiment of FIG. 3 includes all features of the first embodiment of FIG. 1 except that the second embodiment of FIG. 2 differs from the first embodiment of FIG. 1 in the coupling circuitry 30. In FIG. 2, the coupling circuitry 30 includes a serial connection of a number of wires 32, 34 and a number of connectors 33. Without loss of generality, the serial connection of FIG. 2 has two wires 32, 34 and one connector 33. The connector 33 connects the wire 32 which is coupled to the output terminal 14 of the power converter 10 and the wire 34 which is coupled to the input terminal 23 of the computer device 20. The serial connection of the two wires 32, 34 and the connector 33 forms the sole electrical connection between the power converter 10 and the computer device 20.

Figure 3:
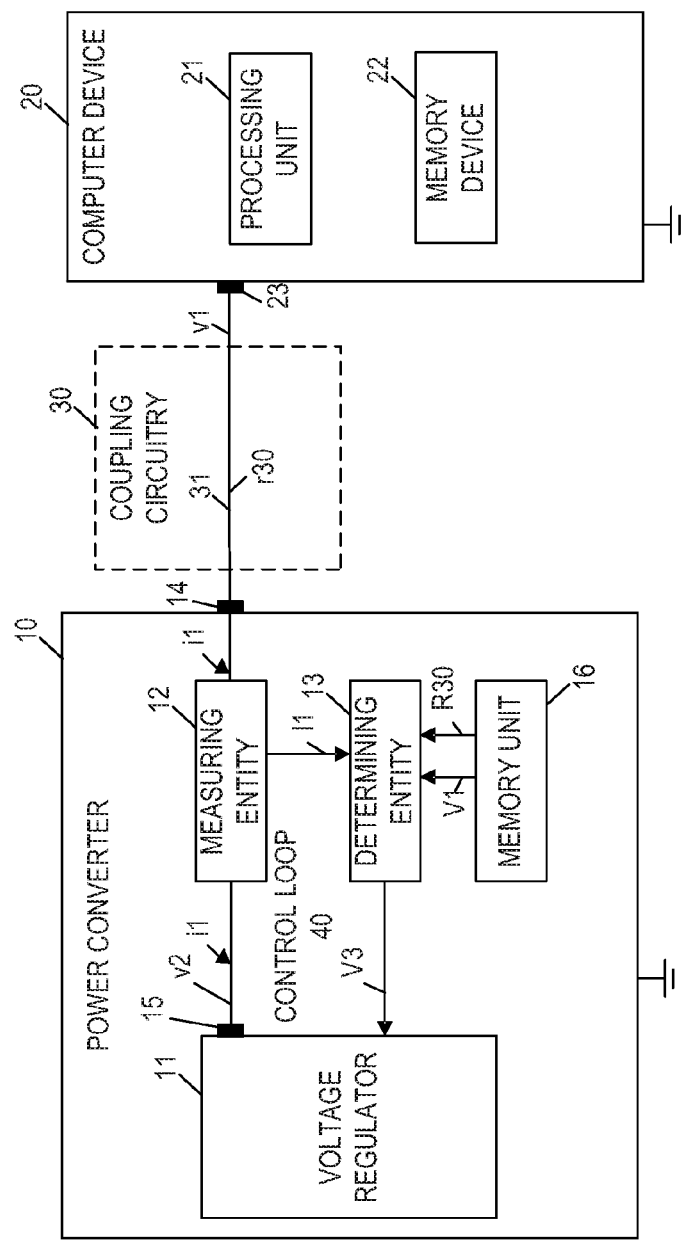
FIG. 3 shows a schematic block diagram of a third embodiment of a power converter coupled to a computer device.

In FIG. 3, a schematic block diagram of a third embodiment of a power converter 10 coupled to a computer device 20 is depicted. The third embodiment of FIG. 3 includes all features of the first embodiment of FIG. 1 and shows a memory unit 16 in the power converter 10 additionally. The memory unit 16 of FIG. 3 is adapted to store the stable input voltage V1, i.e. a parameter indicating the stable input voltage, for example 0.95 V, of the computer device 20 and the resistance R30 of the coupling circuitry 30. The resistant R30 indicates the actual resistance r30 of the coupling circuitry 30, in other words R30 is a parameter describing r30.

In the third embodiment of FIG. 3, the determining entity 13 is configured to query the stable input voltage V1 and the resistance R30 from the memory unit 16 for determining the reference output voltage V3.

Figure 4:
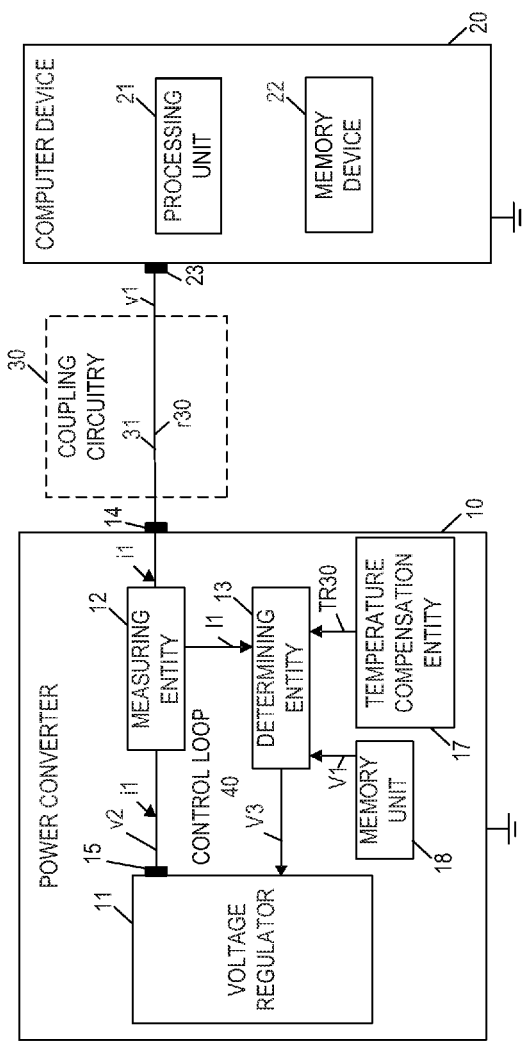
FIG. 4 shows a schematic block diagram of a fourth embodiment of a power converter coupled to a computer device.

FIG. 4 shows a schematic block diagram of a fourth embodiment of a power converter 10 coupled to a computer device 20. The fourth embodiment of FIG. 4 includes all features of the first embodiment of FIG. 1 and has a temperature compensation entity 17 and a memory unit 18 additionally.

The temperature compensation entity 17 may be part of a processor or processing entity of the power converter 10 and is configured to provide a temperature-compensated resistance TR30 of the coupling circuitry 30. The memory unit 18 stores a parameter indicating the stable input voltage V1 of the computer device 20, in short words the stable input voltage V1.

In the fourth embodiment of FIG. 4, the determining entity 13 is configured to determine the reference output voltage V3 such that it equals a sum of the stable input voltage V1 stored in the memory unit 18 and the product of the measured actual output current I1 and the temperature-compensated resistance TR30 of the coupling circuitry 30.

Figure 5:
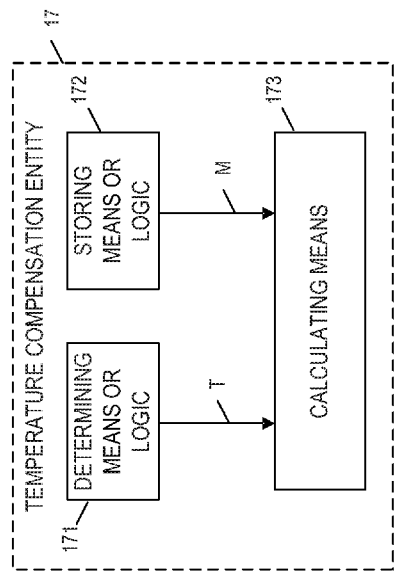
FIG. 5 shows a schematic block diagram of a temperature compensation entity of a power converter.

In this regard, FIG. 5 shows a schematic block diagram of the temperature compensation entity 17. The temperature compensation entity 17 includes determining means or logic 171, storing means or logic 172 and calculating means or logic 173. The determining means 171 are configured to determine an actual ambient temperature T of the power converter 10. The storing means 172 are adapted to store a temperature compensation model M for the resistance R30 of the coupling circuitry 30. The temperature compensation model M describes temperature-dependent changes of the actual resistance r30 of the coupling circuitry 30. The storing means 172 may also be formed as a part of the memory unit 18.

The calculating means 173 are adapted to calculate the temperature-compensated resistance TR30 of the coupling circuitry 30 based on the stored temperature compensation model M and the determined actual ambient temperature T.

Figure 6:
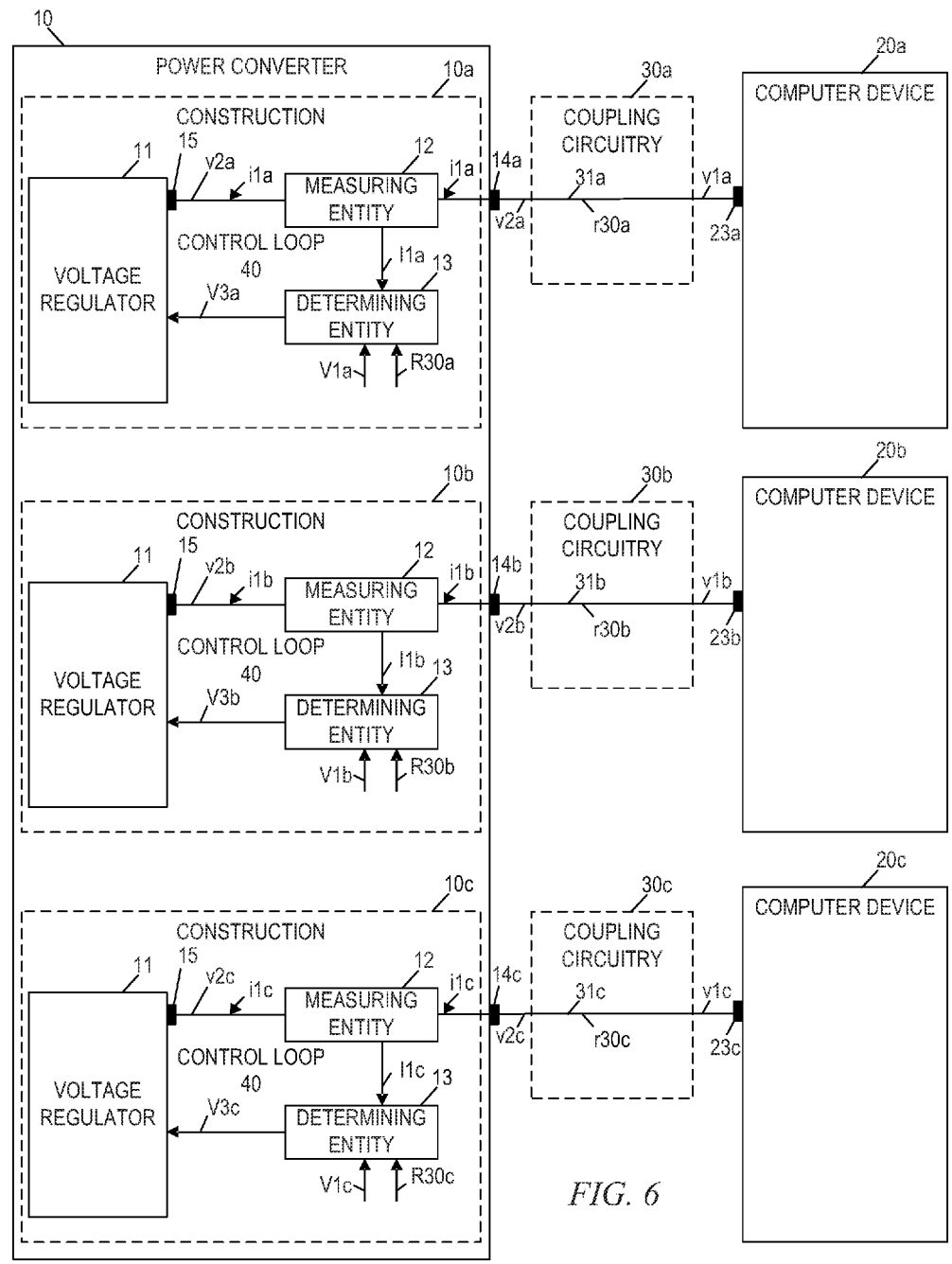
FIG. 6 shows a schematic block diagram of a fifth embodiment of a power converter coupled to groups of computer devices.

Further, FIG. 6 shows a schematic block diagram of a fifth embodiment of a power converter 10 coupled to N groups of computer devices 20a, 20b. 20c. Without loss of generality, N=3 in FIG. 6. The power converter 10 of FIG. 6 is a modular power converter which can provide output voltages v2a, v2b, v2c to different computer devices 20a, 20b, 20c. Each of the groups of the computer devices 20a, 20b, 20c may include its own processing unit and memory device, or even groups of processing units and memory devices.

The power converter 10 of FIG. 6 includes for each group of the N groups 20a, 20b, 20c a respective voltage regulator 11, a respective measuring entity 12 and a respective determining entity 13. The constructions 10a, 10b, 10c of the voltage regulator 11, the measuring entity 12 and the determining entity 13 may be equal for supplying different output voltages v2a, v2b and v2c to the groups 20a, 20b, 20c, but the parameters v2a, v2b, v2c; i1a, i1b, i1c; r30a, r30b, r30c may be different.

Figure 7:
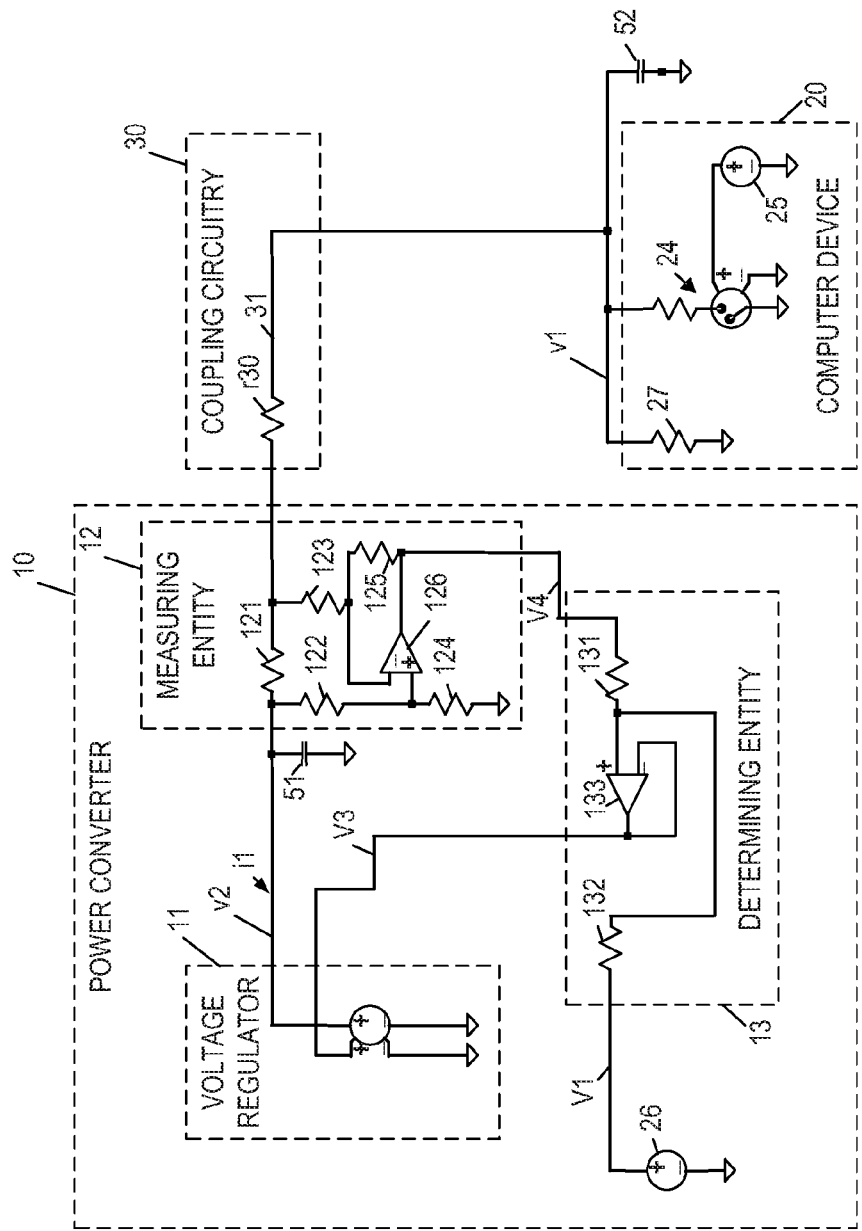
FIG. 7 shows a simulation of a sixth embodiment of a power converter coupled to a load.

In FIG. 7, a simulation of a sixth embodiment of a power converter 10 coupled to a load 20 is depicted. The load 20 simulates the computer device having at least the processing unit 21 and the memory device 22 (e.g. FIG. 1). In detail, the load 20 of FIG. 7 includes a load resistance 27, a load switch 24 and a PWL 25. As a result, the load 20 may be also called changeable load.

As in the above four mentioned embodiments of FIG. 1 to 4, the present power converter 10 includes a voltage regulator 11, a measuring entity 12 and a determining entity 13. The voltage regulator 11 of FIG. 7 controls an actual output voltage v2 for the coupling wire 31 based on a determined reference output voltage V3. The measuring entity 12 includes a sensing resistance 121, further resistances 122 to 125 and an operational amplifier 126. For example, the ratio between the resistance value of the resistance 124 and the resistance 122 is 50. E.g., the resistance value of the resistance 122 may 100 kΩ and the resistance value of the resistance 124 may 5 kΩ. Further, the resistance value of the resistance 123 may be 100Ω, wherein the resistance value of the resistance 125 may be 5 kΩ. In the simulation of FIG. 7, the measuring entity 12 outputs a voltage V4 which is proportional to the measured actual output current I1. The voltage V4 is provided to the determining entity 13.

Further, the determining entity 13 receives the stable input voltage V1 of the computer device 20. For providing the stable input voltage V1, the power converter 10 may include a model load switch 26.

The determining entity 13 of FIG. 7 includes a resistance 131 with a resistance value of 2 kΩ, a further resistance 132 with a resistance value of 1 kΩ, and an operational amplifier 133 receiving the output of the resistance 131 and the output of the further resistance 132. The resistance 131 receives at its input the voltage V4. The resistance 132 is connected between the model load switch 26 and the operational amplifier 133 and receives the actual voltage v1 at its input. The operational amplifier 133 outputs the reference output voltage V3 to the voltage regulator 11.

Moreover, the simulation of FIG. 7 includes capacitors 51, 52 for reducing oscillations in the circuitry. For example, the capacitor 51 has a capacity of 10 µF, wherein the capacitor 52 has a capacity of 10 nF.

Figure 8:
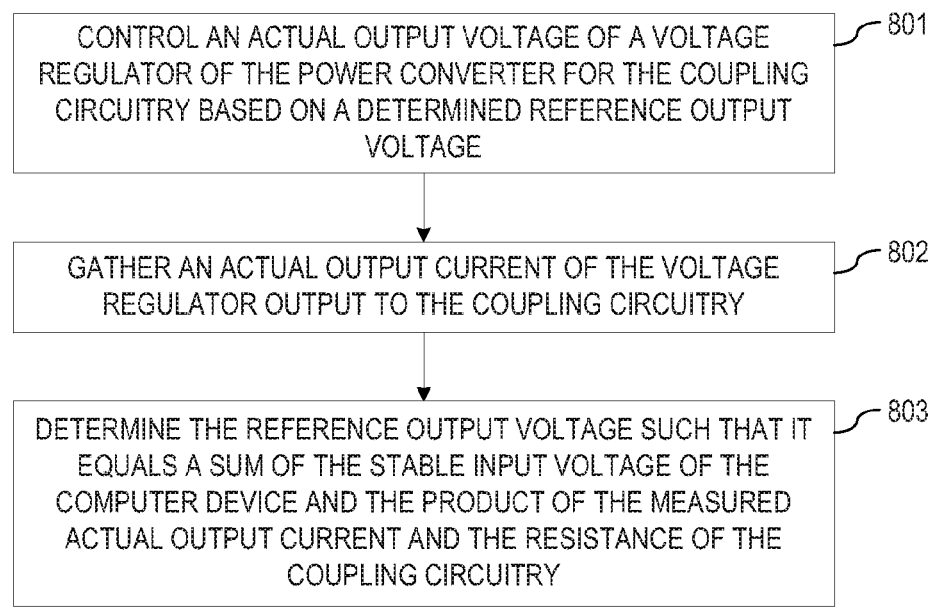
FIG. 8 shows an embodiment of a sequence of method steps for operating a power converter coupled to a computer device.

Furthermore, FIG. 8 shows an embodiment of a sequence of method steps for operating a power converter 10 for a computer device 20 coupled to the power converter 10 by a coupling circuitry 30 and requiring an actual input voltage v1.

In step 801, an actual output voltage of a voltage regulator of the power converter for the coupling circuitry is controlled based on a determined reference output voltage.

In step 802, an actual output current of the voltage regulator output to the coupling circuitry is gathered. For example, the actual output current is determined or measured.

In step 803, the reference output voltage is determined such that it equals a sum of the stable input voltage of the computer device and the product of the measured actual output current and the resistance of the coupling circuitry.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 8 may be implemented in software, as an executable program, the latter executed by suitable digital processing devices. More generally, embodiments of the present invention can be implemented wherein general-purpose digital computers, such as personal computers, workstations, etc., are used.

Figure 9:
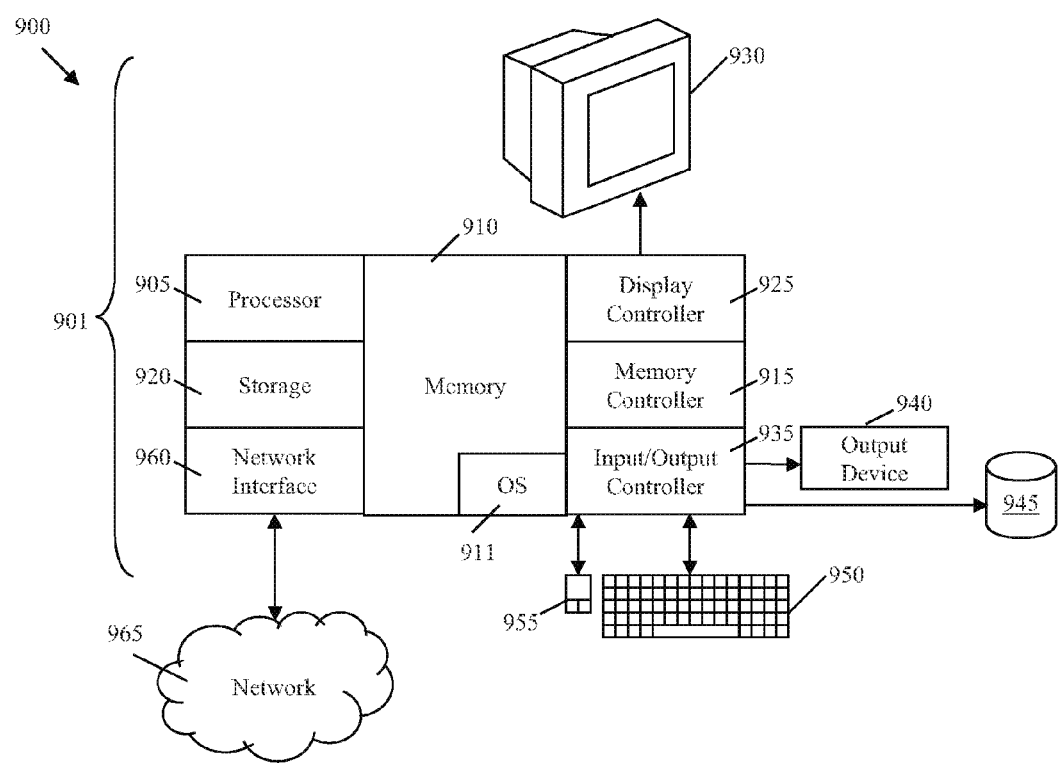
FIG. 9 shows a schematic block diagram of an embodiment of a system adapted for controlling a memory module.

For instance, the system 900 depicted in FIG. 9 schematically represents a computerized unit 901, e.g., a general-purpose computer. For example, the arrangement with the power converter 10 and the coupled computer device 20 of one of FIGS. 1-4 may be embodied in the computerized unit 901 of FIG. 9. In exemplary embodiments, in terms of hardware architecture, as shown in FIG. 9, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 can be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 can include any one or combination of volatile memory elements (e.g., random access memory)

and nonvolatile memory elements. Moreover, the memory 910 may incorporate electronic, magnetic, optical, and/or other types of storage media. Note that the memory 910 can have a distributed architecture, where various components are situated remote from one another, but can be accessed by the processor 905.

The software in memory 910 may include one or more separate programs, each of which comprises an ordered listing of executable instructions for implementing logical functions. In the example of FIG. 9, the software in the memory 910 includes methods described herein in accordance with exemplary embodiments and a suitable operating system (OS) 911. The OS 911 essentially controls the execution of other computer programs, such as the methods as described herein (e.g., FIG. 8), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 can further include a display controller 925 coupled to a display 930. In exemplary embodiments, the system 900 can further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 can also be an IP-based network for communication between the unit 901 and any external server, client and the like via a broadband connection. In exemplary embodiments, network 965 can be a managed IP network administered by a service provider. Besides, the network 965 can be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS can be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g. with reference to FIG. 8) are implemented in software, the methods can be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

The invention claimed is:

1. A power converter for a computer device connectable to the power converter by a coupling circuitry and requiring an actual input voltage, the power converter comprising:
   voltage regulator for controlling an actual output voltage for the coupling circuitry based on a determined reference output voltage,
   a measuring entity for measuring an actual output current of the voltage regulator output to the coupling circuitry,
   a determining entity for determining the determined reference output voltage such that the determined reference output voltage equals a sum of the actual input voltage of the computer device and the product of the measured actual output current and a resistance of the coupling circuitry, wherein the coupling circuitry couples an output terminal of the power converter to an input terminal of the computer device, and
   a temperature compensation entity for providing a temperature-compensated resistance of the coupling circuitry and a memory unit for storing a stable input voltage of the computer device, wherein the determining entity is configured to determine the reference output voltage such that the reference output voltage equals a sum of the stable input voltage stored in the memory unit and the product of the measured actual output current and the temperature-compensated resistance of the coupling circuitry, wherein the temperature compensation entity includes:
      determining logic for determining an actual ambient temperature of the power converter,
      storing logic for storing a temperature compensation model for the resistance of the coupling circuitry, and
      calculating logic for calculating the temperature compensated resistance of the coupling circuitry based on the stored temperature compensation model and the determined actual ambient temperature of the power converter.

2. The power converter of claim 1, wherein the voltage regulator, the measurement entity and the determining entity form a control loop for providing the actual supply voltage to the computer device.

3. The power converter of claim 1, wherein the determining entity is embodied as a determining circuitry and wherein the determining circuitry includes at least one operational amplifier.

4. The power converter of claim 1, wherein the coupling circuitry is embodied as a wire directly coupling the power converter with the computer device.

5. The power converter of claim 4, wherein the wire forms a sole electrical connection between the power converter and the computer device.

6. The power converter of claim 1, wherein the coupling circuitry is embodied as a serial connection of a number of wires and a number of connectors.

7. The power converter of claim 6, wherein the serial connection of the number of wires and the number of connectors forms a sole electrical connection between the power converter and the computer device.

8. The power converter of claim 1, further comprising:
   a memory unit for storing a stable input voltage of the computer device and the resistance of the coupling circuitry, wherein the determining entity is configured to query the stable input voltage and the resistance of the coupling circuitry from the memory unit for determining the determined reference output voltage.

9. The power converter of claim 1, wherein the power converter is connectable to several computer devices by a respective coupling circuitry,
   wherein each computer device of the several computing devices includes a processing unit and/or a memory device and requires a respective stable input voltage, and wherein the power converter comprises for each computing device of the several computer devices:

a voltage regulator for controlling an actual output voltage for the respective coupling circuitry of the computing device based on a determined reference output voltage, a measuring entity for measuring an actual output current of the voltage regulator output to the respective coupling circuitry of the computing device, and a determining entity for determining the determined reference output voltage such that the determined reference output voltage equals a sum of the actual input voltage of the computing device and the product of a measured actual output current and a resistance of the respective coupling circuitry of the computing device, wherein the respective coupling circuitry couples a respective output terminal of the power converter to an input terminal of the computer device.

10. The power converter of claim 1, wherein the voltage regulator is configured to control the actual output voltage for the coupling circuitry such that the actual output voltage corresponds to the determined reference output voltage.

11. A method for operating a power converter for a computer device coupled to the power converter by a coupling circuitry and requiring an actual input voltage, the method comprising:

controlling, by a voltage regulator, an actual output voltage of the voltage regulator of the power converter for the coupling circuitry based on a determined reference output voltage, measuring, by a measuring entity, an actual output current of the voltage regulator output to the coupling circuitry, determining, by a determining entity, the determined reference output voltage such that the determined reference output voltage equals a sum of the actual input voltage of the computer device and the product of the measured actual output current and a resistance of the coupling circuitry, wherein the coupling circuitry couples an output terminal of the power converter to an input terminal of the computer device, and providing, by a temperature compensation entity, a temperature-compensated resistance of the coupling circuitry and storing, by a memory unit, a stable input voltage of the computer device, wherein the determining entity is configured to determine the reference output voltage such that the reference output voltage equals a sum of the stable input voltage stored in the memory unit and the product of the measured actual output current and the temperature-compensated resistance of the coupling circuitry, wherein the temperature compensation entity includes:

determining logic for determining an actual ambient temperature of the power converter, storing logic for storing a temperature compensation model for the resistance of the coupling circuitry, and calculating logic for calculating the temperature compensated resistance of the coupling circuitry based on the stored temperature compensation model and the determined actual ambient temperature of the power converter.

12. The method of claim 11, wherein the voltage regulator, the measurement entity and the determining entity form a control loop for providing the actual supply voltage to the computer device.

13. The method of claim 11, wherein the determining entity is embodied as a determining circuitry and wherein the determining circuitry includes at least one operational amplifier.

14. The method of claim 11, wherein the coupling circuitry is embodied as a wire directly coupling the power converter with the computer device and wherein the wire forms a sole electrical connection between the power converter and the computer device.

15. The method of claim 11, wherein the coupling circuitry is embodied as a serial connection of a number of wires and a number of connectors and wherein the serial connection of the number of wires and the number of connectors forms a sole electrical connection between the power converter and the computer device.

16. The method of claim 11, further comprising:

storing, by a memory unit, a stable input voltage of the computer device and the resistance of the coupling circuitry, wherein the determining entity is configured to query the stable input voltage and the resistance of the coupling circuitry from the memory unit for determining the determined reference output voltage.

17. A computer program product comprising a non-transitory computer readable storage medium having a computer readable program stored therein, wherein the computer readable program, when executed on a computing device, causes the computing device to:

control an actual output voltage of a voltage regulator of the power converter for the coupling circuitry based on a determined reference output voltage, gather an actual output current of the voltage regulator output to the coupling circuitry, determine the determined reference output voltage such that the determined reference output voltage equals a sum of the actual input voltage of the computer device and the product of the measured actual output current and a resistance of the coupling circuitry, wherein the coupling circuitry couples an output terminal of the power converter to an input terminal of the computer device, and provide a temperature-compensated resistance of the coupling circuitry and a stored stable input voltage of the computer device, wherein the computer readable program to determine the reference output voltage further causes the computing device to determine the reference output voltage such that the reference output voltage equals a sum of the stable input voltage stored in the memory unit and the product of the measured actual output current and the temperature-compensated resistance of the coupling circuitry by:

determining an actual ambient temperature of the power converter, storing a temperature compensation model for the resistance of the coupling circuitry, and calculating the temperature compensated resistance of the coupling circuitry based on the stored temperature compensation model and the determined actual ambient temperature of the power converter.

* * * * *